Dec. 8, 1964  E. F. BEEZER  3,160,068
PROPORTIONING ON CAM CUTTING MACHINE
Filed Nov. 21, 1962
7 Sheets-Sheet 1
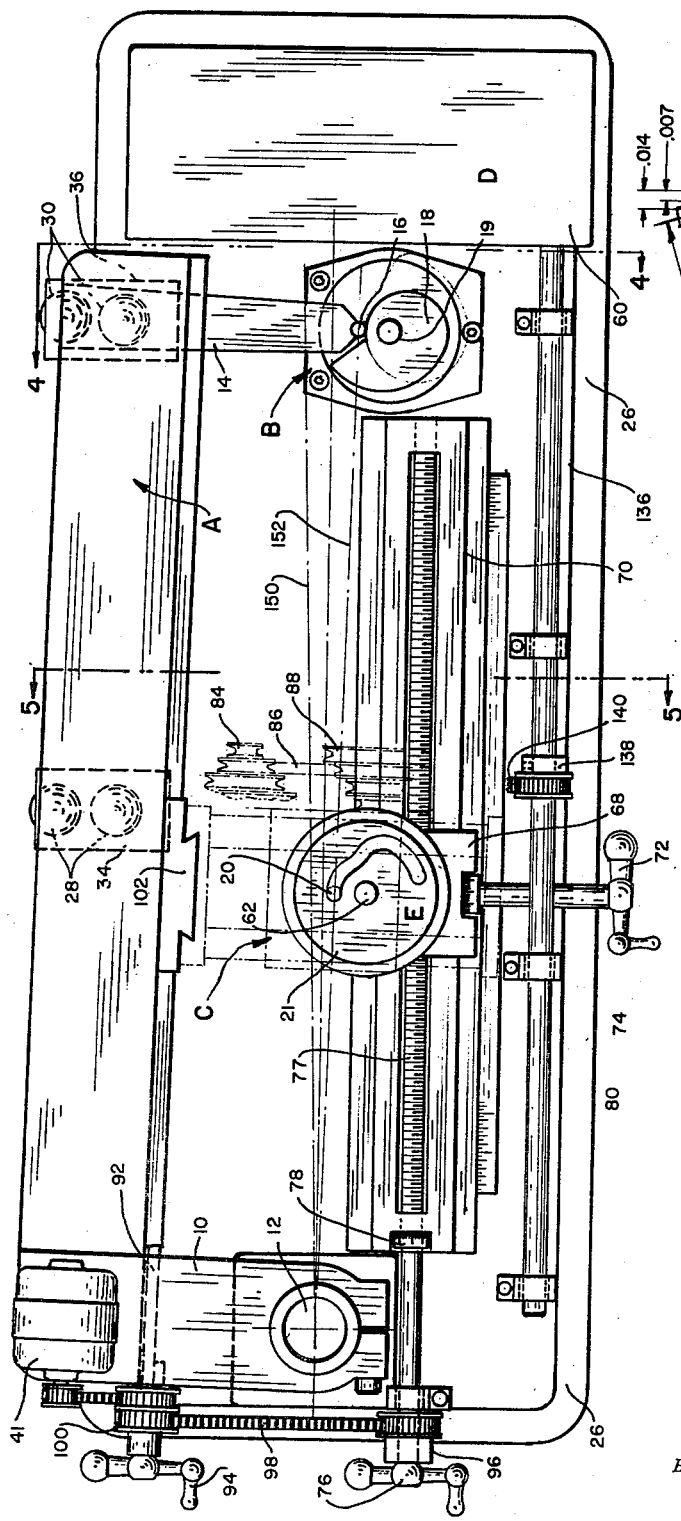
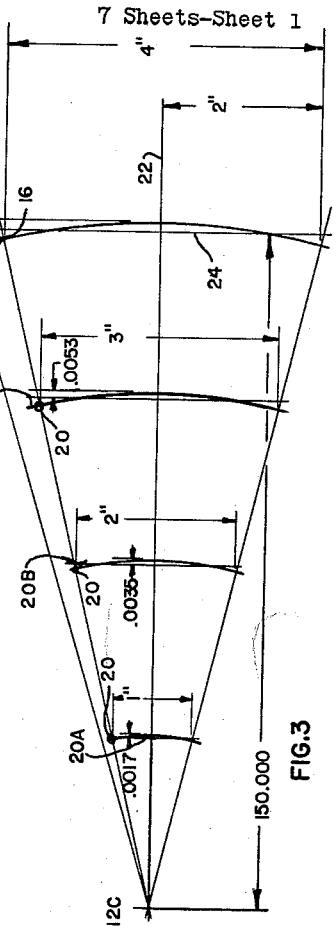
FIG. 1
FIG. 3
INVENTOR.
EARL F. BEEZER
BY *McGlew and Toren*
ATTORNEYS

INVENTOR.
EARL F. BEEZER

Dec. 8, 1964  E. F. BEEZER  3,160,068
PROPORTIONING ON CAM CUTTING MACHINE
Filed Nov. 21, 1962  7 Sheets-Sheet 3

INVENTOR.
EARL F. BEEZER

BY *McGlew and Toren*
ATTORNEYS

Dec. 8, 1964 E. F. BEEZER 3,160,068
PROPORTIONING ON CAM CUTTING MACHINE
Filed Nov. 21, 1962 7 Sheets-Sheet 4

INVENTOR.
EARL F. BEEZER

BY *McKwn and Toren*
ATTORNEYS

INVENTOR.
EARL F. BEEZER
BY
ATTORNEYS

INVENTOR.
EARL F. BEEZER

United States Patent Office 3,160,068
Patented Dec. 8, 1964

3,160,068
PROPORTIONING ON CAM CUTTING MACHINE
Earl F. Beezer, E 75 Hemlock Drive, Paramus, N.J.
Filed Nov. 21, 1962, Ser. No. 239,257
16 Claims. (Cl. 90—13.6)

This invention relates in general to precision cutting machines and in particular to a new and useful cutting machine for cams and similar contoured outlines which is adapted to cut cams of various sizes and shapes by making simple mechanical adjustments and without requiring the making of a master cam.

The present invention is an improvement over copending application Serial No. 771,775 for automatic cam cutting machines filed by the present inventor on November 4, 1958 and now abandoned. In the foregoing application there is disclosed a construction in which a pantograph mechanism is employed to amplify or reduce motions imparted to a cutter in accordance with the curve outline of a series of control cam members arranged in a manner to produce any variation of the usual cam curve outline which are made in modern practice. The present invention is an improvement over the previous application particularly in respect to the improved means for transmitting the motion effected on a follower traversing the control cam member to the cutter. For this purpose the present invention includes an elongated beam member which is pivotally mounted at one end and includes an arm having a follower which may be selectively disposed to engage a predetermined one of a plurality of control cam member outlines. The control cam members are arranged on the machine in removable sets with pattern outlines thereon of the usual cam motion curves which are to be defined on a cam blank surface. For example, a typical set of control cam members would include curved outlines defining constant velocity curves, parabolic curves, simple harmonic curves, cycloidal curves, etc. By making proper settings in the set-up of the machine, it is possible to move the pivotal beam member into operative association with the selected control cam member to impart some multiple of this outlined movement to a cutter which is arranged intermediate the length of the control cam member and moved in proportion to the movement of the follower at the end of the beam member.

The present invention is based on the discovery and realization that motions may be transmitted with great accuracy by employing a beam member of great length which is pivoted at one end and provided with a follower for effecting the controlled movement of its opposite end. When the follower is arranged to traverse a controlled pattern outline adjacent this end it has been discovered that a cutting member adjustably arranged intermediate the length of the beam for swinging backwardly and forwardly with the beam in a proportion of the amount that the follower is swung, will reproduce the outline of the movement of the follower with a great degree of accuracy in the selected proportional amount which is chosen by the location of the cutter in respect to the length of the beam.

In arriving at the preferred constructional arrangement, it was discovered that when the follower swings through an arc at a location at the extreme end of a beam which, for example, may be 150.00 inches from the beam pivot point to the location of the follower, it was appreciated that the follower would be displaced a small distance measured in a direction along the center line of the pivot of about ¾ of 1° on either side of the center line. Thus, for example, if the follower is swung by the master profile outline of the control cam, a total amount of four inches or two inches on each side of the center line referred to previously and the length of the arm from the pivot to the follower is 150.000 inches, then the deviation from a reference line exactly 150.000 inches from the pivot and perpendicular to the center of the axis will be approximately 0.007 of an inch measured along the center line for the four inch swing of the follower. In arranging for the calibration of the machine, this is done by correcting for the deviation of the follower movement from the precise quarter line during its swinging motion to cut the error in half and in the case where the reference distance from the pivot is exactly 150.000 inches then the follower would be mounted at 150.007 inches and thus the error in the swinging movement of the follower is always cut in half. It can be seen that by choosing a sufficiently elongated beam member the error becomes negligible and highly precise cutting motions can be imparted to a cutter by the follower mounted on the swinging beam.

Thus, in accordance with the invention, there is provided a cutting machine which includes a proportional dividing arm or beam which is pivotally mounted at one end and is provided with a tracing arm or follower at its opposite end which is engageable with one of a series of master profiles or cams each having an individual curve outline of the usual motions to be defined by the contour of a cam, such as, for example, simple harmonic, cycloidal, parabolic, etc. A rotary cutter is mounted intermediate the length of the beam and is slidable therealong and arranged to cut a cam blank which is positioned on a table which also may be moved in respect to the beam longitudinal axis or laterally in respect thereto. A cam blank to be cut is positioned on the cam rotary table and the table and the cutter are adjusted in relation to the length of beam in order to provide for the desired proportion of movement of the cutter in defining an outline on the cam as controlled by the pivotal movement of the beam caused by the follower traversing one of the master profiles or control cams. Means are provided, such as an electromechanical control system, for rotating the control cams in a precise timed relationship in respect to the rotation of the table carrying the cam blank so that the cutter will move inwardly and ouwardly to cut the cam in the desired curve outline as set by the control cam. This timed relationship can be predetermined as one of a variety of angular phase relationships. The master cam is set to always turn 320° (in this particular case) for every rise or fall but the rise or fall on the cutter rotary table can be any angle—5°, 27°, 142°, 600°, etc.

The control mechanism advantageously includes means for moving the control cam some multiple of the rotational movement of the cam blank work table so that the motion imparted to the follower by the control cam may be compressed into a smaller (or larger) rotational displacement of the cam blanks or work pieces by the action of the cutter.

A feature of the invention is that the proportional beam arrangement permits the mounting of a rotary cutter, grinding tool or torch for the cutting of any desired cam profile completely automatically and very precisely. Means are provided to automatically permit the cutting, for example, of a rise on the cam over a certain angular turning movement thereof and for thereafter cutting, for example, a fall. The fall is effected by rotating the control cam in an opposite direction, for example, to cause inward movement of the cutter in response thereto. A dwell may be effected by holding the follower at a single location. Suitable automatic means are provided for selecting which of the various rises, dwells or falls are to be effected for the various angular rotational movements of the cam blank, and means are provided for accurately starting one cutting movement and for stopping another until the complete cam blank is automatically cut. The master cam outlines are chosen to provide a wide range of curved contour cutting on the cam blank and the machine is preferably equipped with at least four individual master cam outlines chosen in accordance with the ones most frequently employed in commercial use.

It should be appreciated that while the proportional beam does effect a slight deviation in the actual cutting path described by the cutter from that caused by movement of the follower, the mechanism is arranged and calibrated so that this error at all times is minimum. In fact, since the machine departs from the true curve outline set on the cam in a movement that follows a simple harmonic motion curve, recent theoretical studies have indicated that harmonic motion or modified sine motion which is a form of harmonic and cycloidal motion, produces the most desirable features in respect to cam dynamics. This is true because the harmonic curve has the lowest velocity, least pressure angle and least torque load of curves employed in cam constructions. In any event, the overall effect of this harmonic curve deviation by the machine of the present invention is so slight as to be practically negligible. The departure in a maximum error case would be on the order of 0.007 of an inch for a four inch arcuate movement of the follower based on a radius of the tracing stylus to the pivot point of the proportioning beam of 150.000 inches. Thus in practically every case of cam manufacture the desired cam curve (parabolic, cycloidal, constant velocity, modified trapezoidal, etc.) would be obtained with only a very slight departure from the true curve. The error is maximum in those instances in which a combination of large rises or falls in a small angular increment of cam outline (that is, steep pressure angles) in which case small variations are introduced. However, even in these instances the harmonic factor which is produced by a machine of this invention tends to minimize and in effect improve the cam dynamics for the reasons stated.

Accordingly, it is an object of this invention to provide an improved automatic cutting machine.

A further object of this invention is to provide a cam cutting machine.

A further object of the invention is to provide a machine for cutting cams and similar articles from a blank including means for rotating the blank in timed relationship to the rotation of a master control cam having a curved outline of the characteristic to be cut on the cam blank and a cutter mounted on a pivotal proportional beam member intermediate its length for engagement with the cam blank to effect cutting of the same and a tracer arm at the opposite end of the beam engageable with the control cam for controlling the movement of the cutter.

A further object of the invention is to provide an automatic cutting machine including a proportional beam pivotally mounted at one end and having at its opposite end a follower in engagement with a master control cam and including a cutter member slidable along the length thereof for engagement with a cam blank which is rotatably mounted on a cam blank mounting table which is adjustable longitudinally in respect to the beam and includes means for rotating the cam blank at a speed in proportion to the speed of rotation of the master control cam.

A further object of the invention is to provide a cutting machine which is simple in design, rugged in construction and economical to manufacture.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

In the drawings:

FIG. 1 is a top plan view of a cam cutting machine constructed in accordance with the invention;

FIG. 3 is a diagram indicating schematically the operational movement of the follower and cutter of the machine constructed in accordance with the invention;

Figure 2:
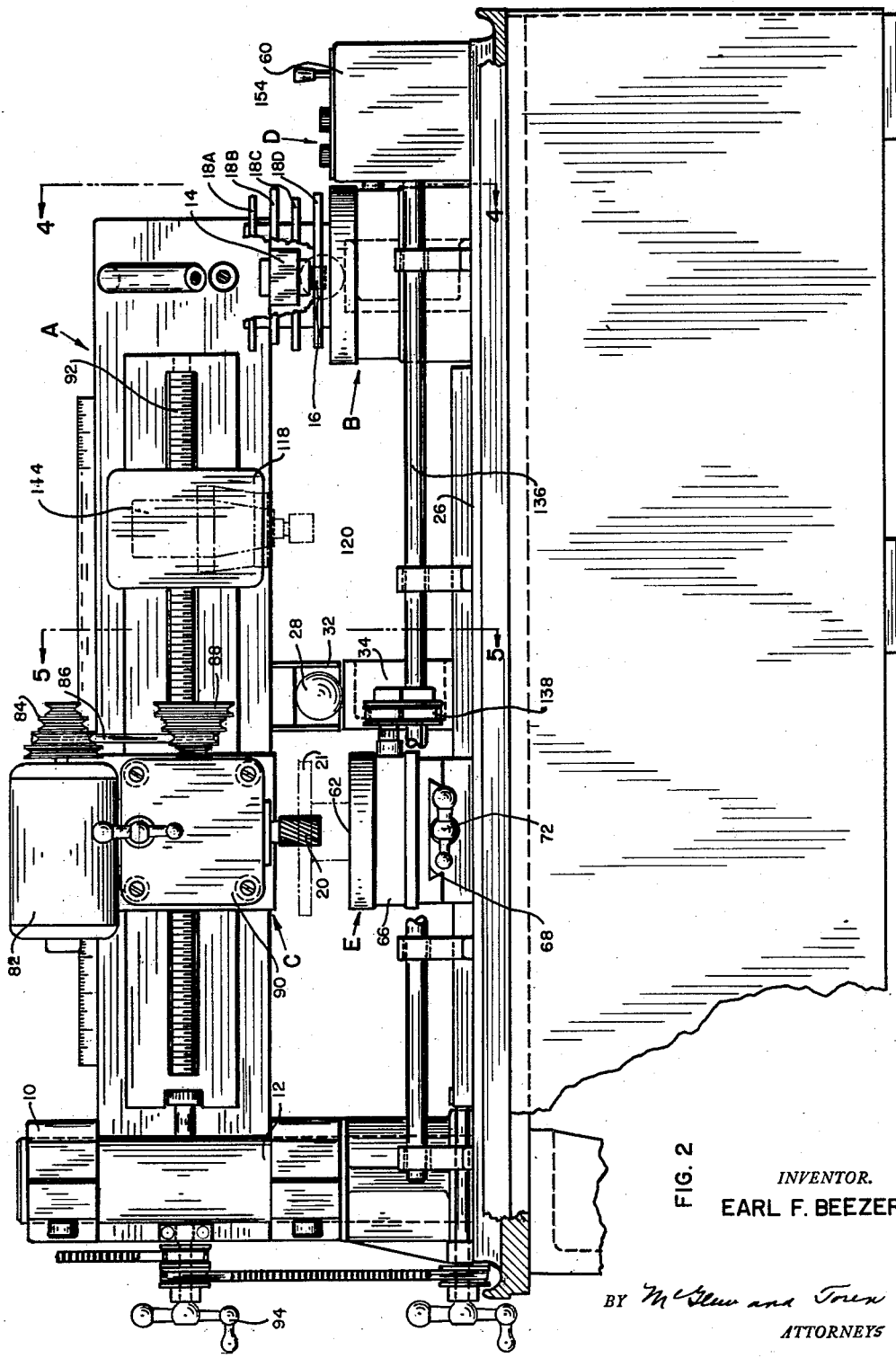
FIG. 2 is a fragmentary front elevation of the machine indicated in FIG. 1.

Referring to the drawings in particular, the invention embodied therein includes generally a beam or proportional dividing arm generally designated A which has a right angle laterally extending portion 10 which is pivotally mounted on an upstanding supporting column or post 12. The outer end of the proportional dividing arm A is provided with a tracing arm 14 having a roller follower 16 which is biased (such as by the beam) into contact with one of a series of control or master profile cams generally designated 18 rotatably mounted on a master cam table generally designated B. Slidably mounted on the proportional dividing arm A is a cutting tool assembly generally designated C (FIG. 2) which may be moved backwardly and forwardly between the pivot post 12 and the cam control operating table B and which includes a portion which may also be moved laterally in respect to the longitudinal axis of the proportional dividing arm A.

In accordance with the invention, the control cam 18 (or a plurality of such cams) is mounted on a shaft 19 above the control cam operating table B and is rotated in definite timed sequence under the control of an electromechanical control mechanism generally designated D which also controls the rotational movement of a mounting table mechanism E upon which a cam blank 21 is rotatably mounted. The tracing arm 14 with the follower 16 moves backwardly and forwardly to cause a similar motion of the beam A and the cutting tool assembly C which carries the cutting tool 20 which is moved backwardly and forwardly in a proportion of the amount of the motion of the follower 16. The proportional amount of movement which is imparted to the cutter 20 by the control cam 18 is determined by the amount of movement about the pivot 12 of the tracing arm 14. For example, if the table E and the cutter 20 with the cutter assembly C are set in position closely adjacent the pivot 12 then a large movement effected by the follower 16 traversing a control cam 18 will produce only a small movement of the cutter by a corresponding substantially identical amount but in a reduced proportion. A positioning of the table E and the cutter 20 in a direction closer to the follower 16 will cause a somewhat greater proportional movement of the cutter upon movement of the follower 16. It should be appreciated that it is within the scope of the invention to mount the cutter 20 and table E on the other side of the proportioning beam A in respect to the follower tracing arm 14 and the pivot 12.

Before describing the manner in which the various operating mechanisms function in detail, reference should be had to FIG. 3 in which there is shown a geometric representation of the motions described by the tracing roller or follower 16. In this figure it is assumed that the follower 16 is mounted to move a maximum of 4.00 inches, two inches on either side of a center line 22 which intersects the center line of the post or pivot 12 and is substantially parallel to the edge of the mounting frame. Movement of the follower 16 will cause a movement of the cutter 20 as indicated by the curves 20a, 20b and 20c in accordance with the distance at which the cutter is arranged from the center of the pivot at 12. Assuming that a reference line 24 measures exactly 150.000 inches from the center line 12c of the post 12 then the point contact of the follower 16 will deviate from the reference line 24 by an amount equal to 0.014 inch total or 0.007 inch on either side of the reference line 24. Therefore, in accordance with the present arrangement of the invention, the radial arc R is made equal to 150.007 inches. In this manner the point follower 16 departs only 0.007 inch either side of the reference line 88 which is exactly 150.000 inches from the pivot center 12c. Thus the total possible departure in the movement of the point contact follower 16 from the cycloidal dimension 150.000 inches is divided in half. The figure in the drawings has been exaggerated in order to illustrate this action clearly.

By making the proportional dividing arm very long the arcuate motion of the follower 16 for practical purposes approaches a straight line 24 and it is this feature which permits operation of the present apparatus to perform the very accurate machining function set forth.

A further consideration is that for various positions of a cutter 20 represented by the cutters 20a, 20b and 20c, the error becomes progressively less in respect to the cutter as the distance to the pivot center 12c is approached. Curve 20a deviates by an amount of 0.0017 inch for a total swinging arc of one inch or one-half inch on either side of the center line 22. This position would be chosen where it is desired for a four inch movement of the follower 16 to obtain a one inch movement of the cutter 20. Curve 20b deviates by an amount equal to 0.0035 inch for a distance of two inches total or one inch on either side of the center line 22. Curve 20c deviates by an amount of 0.0053 inch for a total movement of three inches or one and one-half inches on either side of the center line 22. With the diagram of FIG. 3 in mind it can be appreciated that the cam blank of the machine is adjusted on the work table so that the point of maximum rise is located at the extreme edge of movement of the cutter and that the inward swing of the follower would then define the central portion of a falling curvature on the cam.

A feature of the present invention is that it is possible to manufacture cams without first making a master and it is further possible to merely specifiy in ordering the desired cam a minimum of information. This information would include, for example, the maximum rise dimension from the center line of the cam and the angular extent of each rise, fall and dwell and the type of curve motion which it is desired to include on such angular extent. Prior to the present invention it was usual to provide accurate charts of dimensions at slight incremental angles in order to accurately machine a cam. For example, it was usual in the manufacture of most cams to specify a multiplicity of radial and angular dimensions from a base circle.

While it is true that in instances where a cam effects simple reciprocatory motion of a member which bears directly on the cam it is not necessary to correct for the mounting of the follower, it may be necessary to correct for the mounting of a cam which is positioned to operate at the end of a lever ratchet arm or fulcrum in which event the cam itself travels in an arcuate path. The fact that the cam follower which is a lever arm or similar mechanism moves in a curve in some types of apparatus it is possible to accurately machine such a device in accordance with the present construction without requiring compensation and, in fact, if the cam curve could be moved in a path to duplicate the follower movement, pure mathematical acceleration would be produced on the resultant cam. In the present construction, the cam cutter is moved through a compromised path in which the departure from the true desired contour is cut in half by the arrangements of the various parts.

In order to resolve the error in terms of angular deviation on the cam to be cut, for example, with a rise of 2″ to take place in 60° of arc on a base radius of four inches, the maximum angular error from the theoretical correct value would be 3.1 minutes of arc or approximately 5%.

It can be shown that for the common mathematical curves such as parabolic, cycloidal, trapezoidal, etc., the cam moves through half the amount of its rise in the accelerating period after 70 to 75% of the angular rotations for the same period. This same is true for deceleration. In the example given above for a cycloidal motion, the maximum change per degree would be about 0.065 inch between 29 and 31°. Applying the 5% angular deviation to this figure would mean that the cam error would be in the nature of 0.0032 inch. Since an extreme case has been considered wherein the pressure angle is equal to 43° this error for its normal pressure angle of 30° maximum would be 0.0025 inch maximum.

Thus this departure from a desired curve is not really in error in the practical consideration since it is negligible, and in addition one which does not appear abruptly but increases in a harmonic manner from zero to a maximum and then decreases in the same way. It should be appreciated, in addition, that a departure from a straight line takes place with a harmonic motion. That is, the final motion obtained is one which consists of the desired motion and a small factor of harmonic motion superimposed.

Recent studies have indicated that harmonic motion or modified sine motion, a form of harmonic and cycloidal motion, have the most desirable features for cam dynamics. This is true because the harmonic curve has the lowest velocity, least pressure angle and least torque load on the cam shaft. However, the overall effect of the harmonic factor is so slight as to be altogether negligible. This may be seen from the magnitude of 0.007 inch departure of the tracing follower on a radius of 150.000 inches. Thus in almost every case the desired curve, parabolic, cycloidal, constant velocity, modified trapezoidal, etc. would be obtained with only a very slight departure from the true curve. In those instances where a combination of large rises or falls in small angular increments is essential, the harmonic factor tends to minimize the large pressure angle and in effect improve the cam dynamics for the reasons stated above.

Referring in particular to FIGS. 1 and 2, the mechanism is mounted on a mounting base 26 which carries the upstanding supporting post 12 for the proportional dividing arm A. The arm A is pivoted about the post 12 and supported at a location removed from post 12 on supporting rollers 28, 28, located intermediate the arm and rollers 30, 30, located adjacent its outer end. The rollers 28 and 30 are confined by downwardly extending side walls 32 of a bracket portion to ride on an upper surface of an elongated I-beam member 34 and 36, respectively. The I-beam 34 and 36 are attached to top of the mounting base 20.

Figure 4:
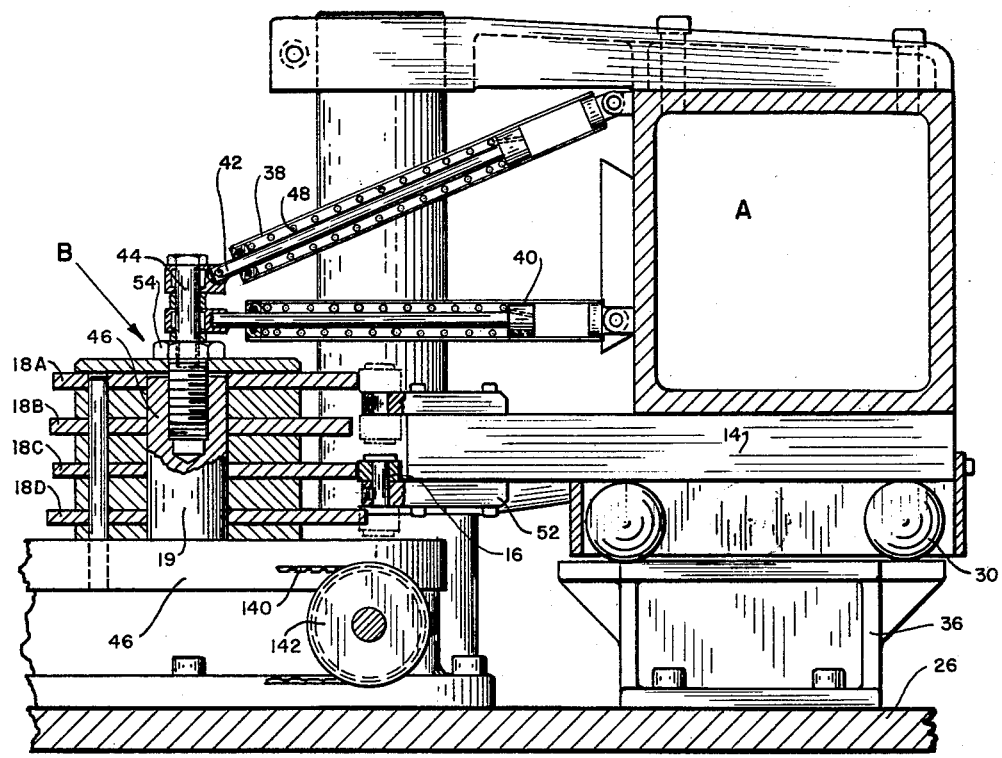
FIG. 4 is a fragmentary vertical section taken on the line 4—4 of FIG. 2.

The tracing arm 14 with the roller follower 16 is held in biasing engagement with a selected one of the control or master cams 18 by means of a diagonal and horizontal spring assembly generally designated 38 and 40, respectively (FIG. 4). Each spring assembly 38 and 40 includes a piston rod element 42 which is anchored to a bolt extension 44 secured to a rotatable cam shaft 46. A spring 48 biases each of the piston rod members 42 but in their associated cylinders 50 which are secured to the proportioning arm A so that the follower 16 is maintained in contact with the selected cam. As indicated in FIG. 4 the follower 16 is in contact with selected cam 18c and it is rotatably mounted on a mounting block 52 which may be shifted in accordance with whether it is mounted in an inverted or upright position and in accordance with whether it is mounted on the upper or lower portion of the arm 14 to positions at which it will contact any one of the cam outlines 18a, 18b, 18c and 18d.

The various cams 18a to 18d have profiles of various types of motion and in the embodiment shown they include the constant velocity 18a, parabolic 18b, cycloidal 18c and modified trapezoidal 18d. Other sets of cams may be maintained and stocked and they are easily removable by removing a stud 54 from the upper end of the cam shaft 46 and then removing each of the plates and the spacing discs. In addition to the selection of cams for the various motions desired the cams are also provided for different sizes of cams to be manufactured. For example, each cam may advantageously have a maximum total rise of 4 inches for a similar fall which is effected by reverse rotation of the cam. By choosing a cam as large as four inches it should be appreciated that such a cam may be used to generate any rise or fall less than approximately 3¾ inches down to approximately ¼ inch in any selected increment which is infinitely variable. Lesser rises or falls can be obtained by employing a master cam having a (.300) three hundred thousandths of an inch throw to generate all increments in the range of .250 inch down to 0.005 inch.

Figure 5:
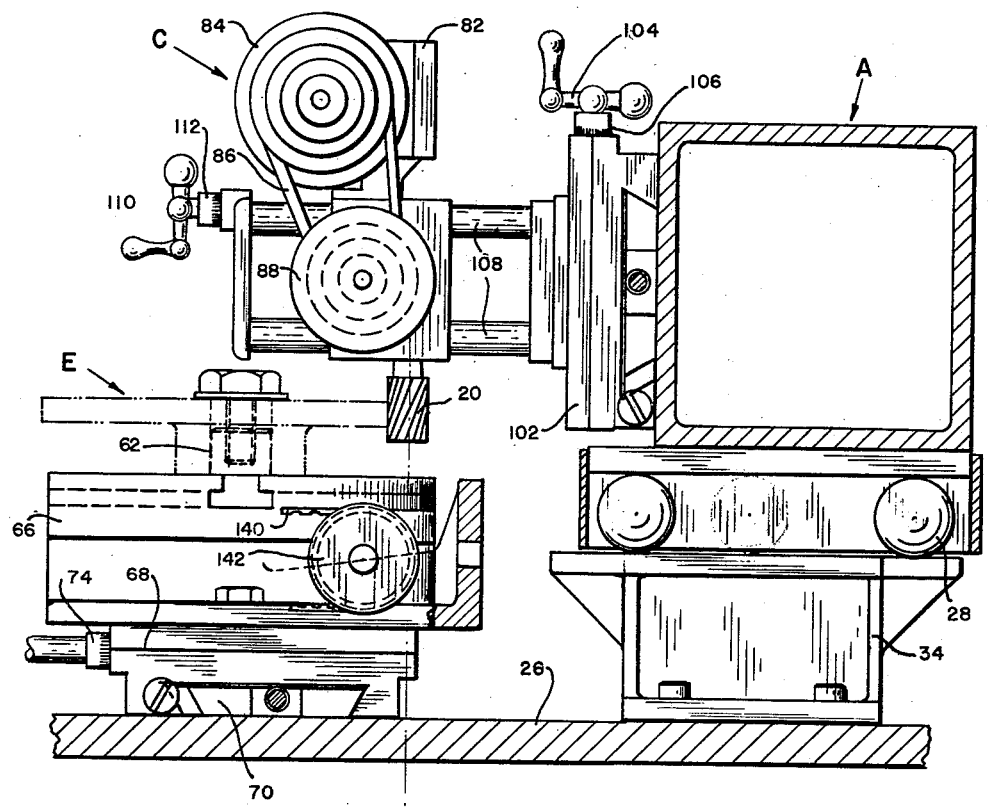
FIG. 5 is a vertical section taken on the line 5—5 of FIG. 2.

In accordance with the invention a motor 58 is provided within a cover 60 of the electromechanical control mechanism D and is arranged to rotate cam shaft 46, the control cams 18, to cause movement of the follower 16 and swinging movement of the proportional dividing arm A. A similar motion at a greater or lesser rate is also imparted to an upstanding supporting shaft member 62 upon which is secured a cam blank 64. The supporting shaft member is rotatably mounted on a table 66 which may be laterally shifted on a dovetail slide 68 (FIGS. 2 and 5) backwardly and forwardly across the mounting base 20. The table 66 is also mounted on a dovetail slideway 70 and may be shifted longitudinally along the supporting base 20. Control of the shifting movement is accomplished laterally by means of the crank handle 72 as set by a micrometer scale 74 and shifting movement in a longitudinal direction is effected by means of a crank handle 76 or power driven by means of motor 41. Accurate readings of the position of the slide is read by the micrometer scale 78 (FIG. 1) and cross-readings of the positioning of the slide may be read from a scale 80.

The cutting assembly C includes a motor 82 which drives through variable speed pulleys 84 and 86 connected by a belt 88, shafting within a speed gear housing 90. The completed assembly is threadably supported on a lead screw 92 and 2 dovetail slides and it may be shifted to any position along the length of the proportioning arm member A by rotation of the handle 94 attached to one end of the lead screw 92 as indicated in FIGS. 1 and 2.

In view of the fact that it is usual to position the cutter 20 in vertical alignment with the table E, each of the cutter and the table is advantageously adjustable laterally in respect to the proportioning arm A. For this purpose lead screw 77 which carries the table 66 is provided with a pulley 96 which is connected by means of a belt 98 to a pulley 100 which is affixed to the lead screw 92. Rotation of either of the handles 76 or 94 will be effected to displace each of the cutting tool assembly C or the cam mounting table mechanism E longitudinally along the supporting base 20. Thus both the cutting assembly and the table for supporting the cam are adjustable longitudinally and the table for supporting the cam may be adjusted laterally in the event that a cam to be cut must be cut with an offset. The cutter assembly C may also be raised or lowered on a slideway 102 to change its vertical elevation by means of a hand wheel 104 having its associated scale 106. The cutter assembly may also be shifted backwardly and forwardly on horizontally spaced supporting shafts by means of a handle 110 having its associated scale 112. The handle 110 is provided to move the cutter assembly C away from the work piece in order to change cutter, etc. Ordinarily the center line of the pivot column 12, of the cutter 20 and of the tracing roller or follower 16 must be all in the same line. However, on some occasions for specific requirements the cutter may be moved off the center line for cutting operation.

Figures 7, 8:
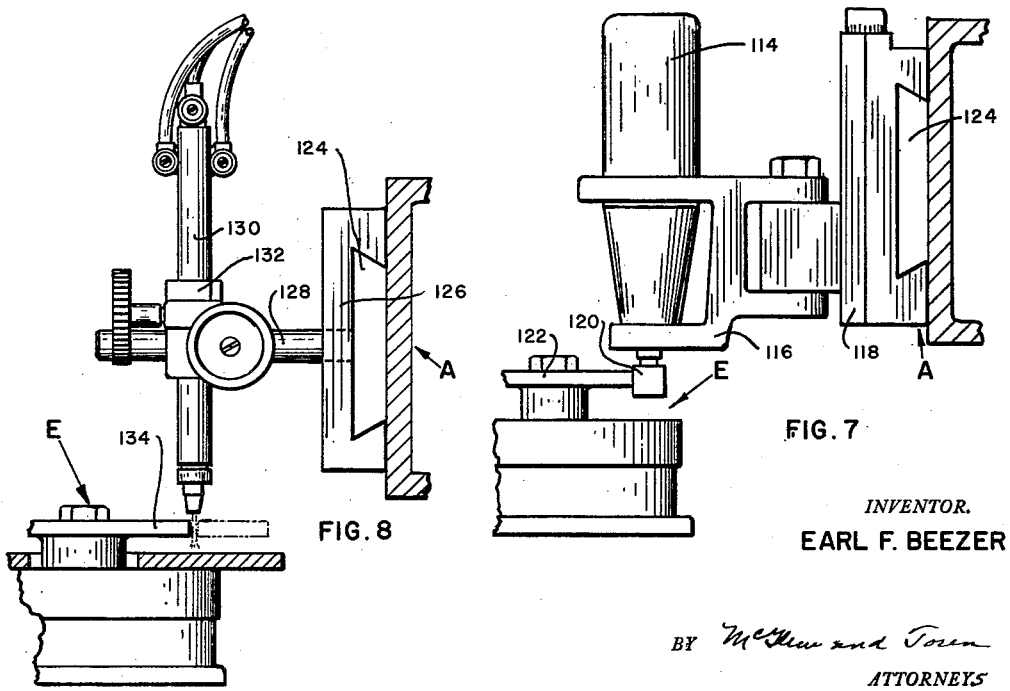
FIG. 7 is a fragmentary vertical section similar to FIG. 5 of another embodiment of the invention.
FIG. 8 is a section similar to FIG. 5 of still another embodiment of the invention.

In FIGS. 7 and 8 there are indicated alternate embodiments of cutter. In FIG. 7 a grinding motor 114 is mounted on end in a supporting bracket 116 which is pivotally connected to a mounting plate 118 and is provided with a grinder 120 for effecting grinding operations on a work piece 122. A high speed carbide cutting tool may also be used as a grinding head. The plate 118 is mounted for longitudinal movement on a dovetail slideway 124 on the same proportioning arm member A.

In FIG. 8 a mounting plate 124 which is movable longitudinally on a slideway 126 of the mounting beam A''. It carries an outstanding shaft 128 on which is mounted a cutting torch 130 having a bracket 132 permitting vertical and lateral adjustment thereof to operate on a work piece 134.

Figure 9:
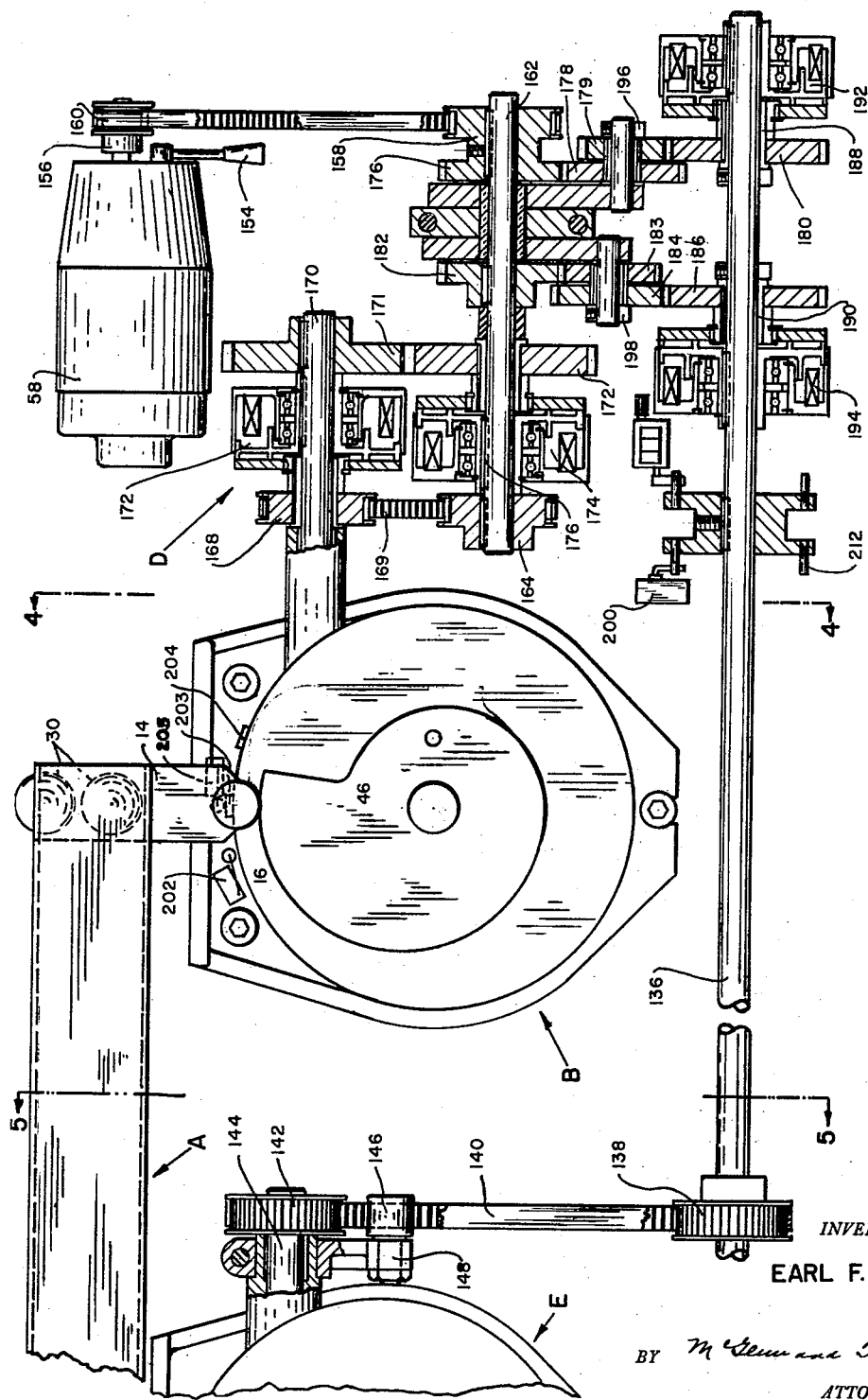
FIG. 9 is a somewhat schematic plan view of the master cam mounting table and drive means for effecting the appropriate movement of the master cams and the cam blank mounting table.

Referring to FIG. 9 it can be seen that the electromechanical drive mechanism 60 effects controlled rotation of a horizontally elongated shaft 136 which has a timing pulley 138 which drives through a timing belt 140 to a timing pulley 142 affixed to a shaft 144 which rotates the supporting shaft member or work table support 62. In order to provide for any position of this table transversely or laterally various size belts may be provided for insertion around the shaft 136 for driving the shaft 144. The tightening of the belts in order to remove slack is accomplished by means of a takeup roller 146 which is rotatably mounted on a clamping arm and bears against the belt 140. Since the cutter rotary table 62 is slidable transversely on the dovetail 68 it is possible to machine cams of various radial sizes. Since the cutter, pivot and tracing follower 16 would be ordinarily on the same center line it is necessary that the cam blank be moved toward the cutter for the smaller sized cams and away from the cutter for the larger sized cams. Usually the transverse position of the cam blank is set so that the cam to be cut is located with its predetermined high point just touching the cutter and the common center line as indicated in FIG. 1 by the dotted line 150. Thus the fall portion to be defined on the cam to extend to the low point can be generated as the common center line moves from line designated 150 to line designated 152. The transverse positioning of the width supporting table E is done by the hand wheel 72.

Since a cam profile consists of a series of rises, falls and dwells in various combinations, it is necessary at different times to rotate the control cams 18 in a given direction or in an opposite direction or to stop it entirely. In the embodiment indicated clockwise rotation of the control cam shaft 46 will produce a fall on the cam to be cut as this would cause the proportioning arm to move toward the cam center and counter clockwise rotation would cause movement away from the cam center. No rotation of the cam shaft 46 would effect a stationary holding of the follower 16 and thus permit generation of a circular arc on the cam being cut for the effecting of a dwell thereon. The electromechanical control mechanism performs the rotation of the cam shaft 46 in either direction or stops the rotation thereof altogether in accordance with the selected sequence. The particular sequence is predetermined by a control circuit to be described more fully hereinafter. Of course, during the various changes in the rotary movement of the shaft 46 the rotary table 62 does not stop but continues to cut continuously.

Motor 58 indicated in FIG. 9 is a variable speed motor which may be adjusted by means of a control lever 154. It is provided with a pulley 156 which drives a pulley 158 through a timing belt 160. The speed of metal removal from a cam blank can be changed by varying the speed of the motor 50. The pulley 158 is affixed to a shaft 162 which is continuously rotated and also continuously rotates two pulleys 164 and 168. The pulley 168 is freely mounted on an input shaft 170 which only rotates when an electromagnetic clutch 172 is energized, the drive being from the pulley 168 through the clutch 172 to the shaft 170. At other times pulley 168 will turn freely on shaft 170.

In a similar manner gear 172 is freely rotatable on the shaft 162 but it is only coupled to the shaft 162 when an electromagnetic clutch 174 is energized by means of a part 176. Therefore, by appropriate sequencing of the clutch the input shaft 170 may be rotated in either direction. This is accomplished because gears 172 and 171 have opposite relative angular rotations whereas tooth pulleys 164 and 168 through the tooth timing belt 169 have the same relative angular rotations. Thus the clutch 172 or 174 causes rotation in one direction to rotate the input shaft 46 in one direction and the other clutch causes counter rotation of the input shaft 46. When both clutches are de-energized slippage of both systems takes place and no rotation occurs and this is effected when a dwell is required. The action of the clutches is instantaneous so that no lost motion occurs.

In the embodiment indicated the master cam rotary table cam shaft 46 turns approximately 320° to minimize pressure angle for every rise or fall sequence. Thus an angular displacement of 320° has been arbitrarily selected. Since the angular extent of the rise or fall sequence may be at any particular angular amount it is not necessary to alter the speed relationship between the rotational speed of the cam shaft 46 and the rotational speed of the cam work table support 62. Speed changes may be effected between the two, however, if desired. For example, an 80° angular rise on a cam to be cut over the 320° range of the control cam would require 4×80° or a 4 to 1 speed reduction. The same mathematical curve characteristic is imparted to the cam being cut but in a condensed or compacted proportion in the smaller angle of work piece rotational movement in the same manner that a four inch rise on the master cam assembly is compacted into any smaller increment of the cam to be cut. It can be proved mathematically that the various curves, cycloidal, parabolic, modified trapezoidal, etc., can be proportionately reduced in this manner without any error.

In order to condense the 320° of rotation of the control into a smaller angle of a larger angle on the cam being manufactured, two clusters of compound gear trains are provided. A gear 176 is affixed to shaft 162 and it meshes with gear 178 which rotates gear 179 and 180 to control angular speed variations for a first dwell on the cam to be cut. Gears 182, 183, 184 and 186 are provided for the second dwell in the event that this dwell differs in angular magnitude from the first dwell. If the first and second dwell is the same then only gear train 176, 178, 179 and 180 are necessary. The last given driven gear 180 and 186 in each case is freely rotatable on the shaft 136 by means of bushings 188 and 190. The bushings 188 and 190 are coupled to the shaft 136 at appropriate times when electromechanical clutches 192 and 194 are energized. This, of course, never occurs simultaneously. In addition to the effecting of the speed change between the cam shaft 46 and the work piece supporting shaft 62, the gear trains also act as driving gears 40 with the supporting table 62, during a dwell when no movement of master cam is taking place. An advantage of the arrangement is that ordinarily only gears 179 and 184 need be changed for all the angles from 20 to 130° in each 1° increment and these changed gears are readily obtainable from stock from many suppliers. For angles greater than 130° and less than 20°, gears 183 and 182 or gears 176 and 178 may be changed.

All the gears are so selected that the angular extent in degrees of the movement of the cam to be cut correspond with the number of teeth on the gear. Thus a 95 tooth change gear is used for cutting a cam having 95° rise or fall. Change gears 179 and 184 are readily changed by removing retaining collars 196 and 198, respectively.

When cutting a dwell portion of the cam, it is essential that an accurate count of degrees turned is maintained so that at the end of a predetermined angular interval the succeeding rise or fall may be started. This is done by means of a switch 200 which energizes a solenoid intermittently for each degree of rotation during a dwell cutting operation of the cam supporting table 62 through the closing of an appropriate relay contact to be described later.

A manual reset counter is provided for use when required (for instance, when full 360° cutting of a cam is not desired).

In the cutting of a cam it is usual procedure to cut four separate distinct operative arrangements on the cam. For example, the first sequence could be 60° in which a fall is cut of a particular motion. A second sequence would be of 120° in which a dwell is cut at a constant radial arc. The third sequence could be a rise which would last for 90° and be of the same predetermined motion curve; however the cutting may be interrupted at this point and by shifting the tracing roller to an alternate position, a curve of different mathematical characteristics may be cut. As may be seen from the control panel, any portion of a cam may be cut, the machine stopped at different curves, increments of rise (or fall) changed, and cutting resumed.

Figure 6:
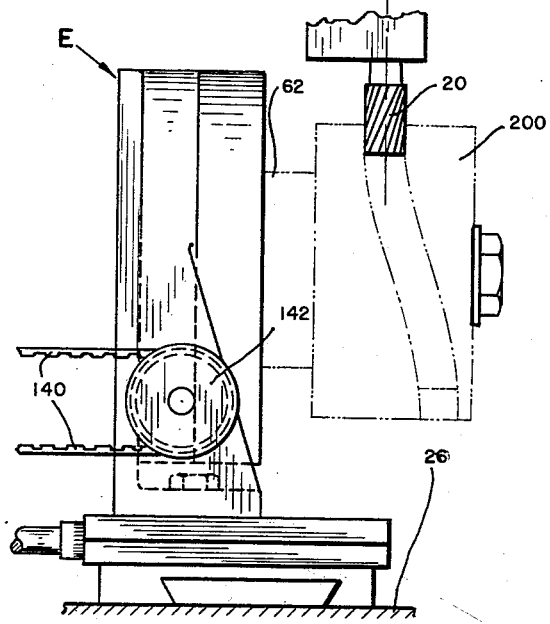
FIG. 6 is a vertical section similar to FIG. 5 but indicating a work table in position for cutting a cylindrical cam.

The first step in the above is to set up the machine by mounting the cam work piece on the supporting table 62 as indicated in FIG. 2 or in the event that it is a cylindrical cam that is to be cut, the table E would be shifted to the upstanding position indicated in FIG. 6 at which point the rotary supporting shaft 62′ supports a cylinder cam blank 200. After the work piece is mounted the cutter 20 and the center line of the cutting table are located in respect to each other and at one-quarter of the distance from the curve 12c to the tracing roller 16, since one-quarter of the distance is proportionally one-quarter of four inches rise on a master cam or would produce a one inch rise on the cam to be cut. This is assuming that the cam to be cut requires a one inch fall, and a one inch rise and a five inch outside radius.

The rotary table assembly E is moved transversely until the cutter which is located on the common center line of the pivot 12c is aligned with table E and follower 16 is positioned for cutting. This is done by turning the hand wheel 72 until the cutter cuts into a five inch radius which locates the high point of the cam. Several roughing cycles are usually necessary to form the blank to the approximate final shape, before the finishing cycle is run. For these an automatic reset switch may be used to repeat a complete cycle and then it is only necessary to move the cutter inward on the cam for each roughing cycle. The common center line will then fall in the position 150 as indicated in FIG. 1 in a position to effect the cutting of a fall portion which is required first. A 60 tooth change gear is installed as the gear 179 for the first fall and a 90 tooth change gear is provided for the gear 184 for the rise portion. 120° is set on the predetermining counter for the first dwell and 90° on another predetermined counter for a second dwell. Thereafter the electrical control means are actuated to select the various fall, rise, dwells, stop sequence on the control panel. Machine start button is pushed to commence the cutting operation.

Immediately clutches 172 and 192 will energize. Clutch 172 will couple pulley 168 to the input drive shaft 170 to start rotation in a clockwise direction of the cam shaft 46 causing the follower 16 and arm A to move in to effect a fall on the cam being cut. This causes cutter 20 to move in on the work piece and generate a fall of one-quarter of the amplitude of the four inch fall effected on the master cam 18. Clutch 192 couples gear 180 to the shaft 136 to drive the supporting shaft 62 for the work piece and effect turning of the supporting table 60° for 320° rotation of the master cam 18 and thus condense a four inch fall and 320° of rotation into a one inch fall and 60° of rotation. At the completion of this sequence a microswitch 202 will be tripped by a stop 204 on the rotary table 62 after 320° of rotation has taken place. Immediately clutch 172 will be de-energized to stop rotation of the master rotary table 62. Clutch 192 remains energized to continue driving shaft 136 and enable cutting of a dwell. A pin 212 causes microswitch 200 to close during every 180° of rotation of the table. With appropriate relay contacts closed the switch 208 intermittently energizes a solenoid to trip the electric predetermining switch backwards from 120° initial setting, one degree at a time. When 0 is reached this switch initiates the next sequence which is a rise sequence.

The following events then occur simultaneously: Electric clutch 174 is energized to couple gear 172 and drive gear 171 thus turning the rotary table cam shaft 46 in a counter clockwise direction to cause the arm A and the roller 16 to move outwardly from the master cam to produce a rise on the cam being cut.

At the same time, electric clutch 192 is de-energized and clutch 194 is energized to drive the shaft 136. Thus gear 184 with the 90 teeth has taken over the drive to condense 320° rotation of the master cam into 90° rotation of the cam being cut.

Since all of the events take place instantaneously no interruption of drive to the table supporting the cam for cutting takes place and cutting continues smoothly from the dwell to the rise portion of the sequence. The master cam rotation 18 continues inwardly to cause the arm A to move outward and thus generate a one inch rise on the cam blank until it comes to 320° position at which time stop 204, 2 switches and two stops are required, see FIG. 9, and actuates the microswitch 205 to signify the end of the rise portion. Instantly electric clutch 174 will be de-energized to stop the drive of the tooth pulleys 164 and 168 and thus the rotation of the master cam rotary table cam shaft 46. This will cause the dwell portion to commence since arm A will stay fixed. At the same time, electric clutch 194 remains energized to provide a positive drive to the rotary table holding the cam blanks. In addition, switch 200 will be closed intermittently by pin 76 for each degree of rotation of the shaft supporting the cam blank. However, this will only ensue for 90° corresponding to that desired for the second dwell. At the end of this time appropriate relay switching, to be described more fully hereinafter, will stop the machine and this typical cam is completely formed. Ordinarily several complete cycles will be necessary—that is roughing cuts to progressively form the cam contour—following a finishing cut cycle—or finish grind cycle and therefore appropriate automatic reset for repeat cycles would be incorporated in the practical application.

A typical fall dwell, rise dwell stop sequence has been described but it should be appreciated that many other sequences are possible. By reference to the schematic wiring in each diagram it can be seen that the various sequences consist of a portion of this sequence and by proper settings these are readily preset into the machine for continuous machine operation.

The proportioning arm A is usually massive to provide adequate rigidity due to the heavy cutting reaction in vertical and horizontal directions in all planes. The square tubing section has the best section modulus of any geometric shape to accommodate reactions in any direction normal to the longitudinal axis and can thus insure optimum flexural rigidity. Thus flexural deflection is kept to a minimum over its unusually long length.

The heavy weight of the proportioning arm A is amply supported on four large steel balls to insure a more frictionless rolling motion. This eliminates any slip and bind motion which will introduce errors in cam profiles.

The balls are spaced far apart so as to overcome any torque effect due to the offset of the cutting head being acted upon by any cutting reaction in the vertical or near vertical direction. Thus angular twist of the proportioning arm is eliminated by virtue of the heavy arm being supported on four rectangularly spaced balls.

The large pivot column 12 and a supporting base provide adequate rigidity for cutting reactions in the longitudinal directions, principally by the fact that the inwardly directed arm 10 is located near the base of the column 12. Arms 10 and 10 which are located at the top and the bottom of the supporting column have split bores to gear against the column 12 and adjusting screws can be set so as to permit rotation of the arm with a zero clearance and shake. The base table is of a thick cast iron construction to minimize machine vibration with a ground surface all over for ease and flexibility in the setting up of the infinite varieties of the cams which may be made on this operation.

An important feature of the present invention is that the control for moving the cutter 20 is such that the cutter is never brought into engagement with the work piece with a large pressure angle. This is true because the follower 16 is carried at the end of the proportioning arm 24 and the movement of the follower is greater than the proportional movement of the cutter. In addition, the follower is moved in accordance with the outline of the master cam 18 which outline is chosen so that the characteristic curve for a rise or fall is distributed over as large an angular range as possible. For example, it has been found practically best to have the master cam 18 contoured to the appropriate rise or fall curvature over an angle of 320°. This insures that the rotation of the master cam 18 through the 320° provides the necessary contour cutting of the work piece moved through a much smaller angle without the cutter operating under a large pressure angle.

A further feature of this construction is that by choosing the profile of the cam 18 to extend for an angle of 320° it is a simple matter to change the angle of movement of the work piece during the traverse of the roller 16 over the cam 18 by a simple change in the transmission gears 184 and 179 for the appropriate rise or fall driving operation. Thus, for example, gears 184 and 179 will have the same number of driving teeth where the angular extent of the rise and fall to be cut on the cam work piece is to be the same. However, where the rise is to be different from the fall, a gear having a different number of teeth may be employed for the fall driving through the gears 184 than for the rise driving through the gear 179.

It should be appreciated that normally the machine is set up for first cutting a fall on the work piece and in such a position the cam 18 would be in a position opposite from that indicated in FIG. 1, that is rotated approximately 320°. In such a position, when the shaft 19 is rotated, the roller 16 would be moved gradually inwardly as it moves around the curve back to the position which is shown in FIG. 1.

Figure 10:
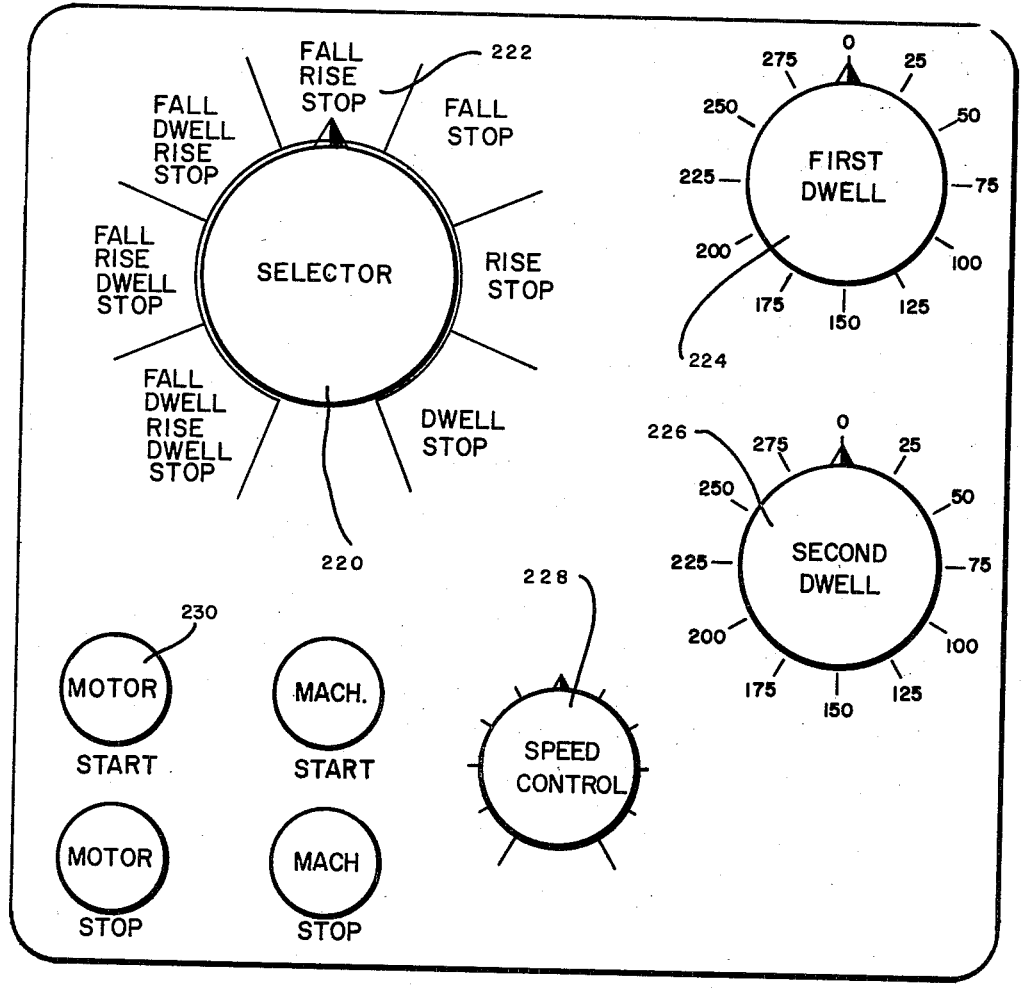
FIG. 10 is a front view of the control panel for selecting the particular machining cycle to be employed for the various operational sequences.

Referring to FIG. 10, there is indicated a control panel for effecting almost all of the normal cam cutting operations by a complete automatic operation of the machine. The control panel includes a selector dial 220 having a pointer 222 which may be positioned at one or more of the selection stations indicated for cutting the various fall, rise and dwell combinations. For example, if the pointer is moved to the portion designated "Fall, Dwell, Rise, Dwell, Stop," the machine will operate to cut a complete cam through the angular ranges selected for the sequence indicated. After the selector dial is set, the first dwell dial 224 is rotated away from zero by angular degrees indicated to set the amount of dwell, that is angular extent of rotation of the cam work piece during no rise or fall which will be cut as a dwell, with the cutter remaining in a stationary position in respect to the center of the workpiece.

A second dwell dial 226 is provided, and a similar angular degree setting is made thereon for effecting the cutting of a second dwell after the selected fall dwell and rise has been cut first.

After setting the selector and dwell dials the table E carrying the work piece is shifted along the length of the proportioning beam A in order to accurately position the table in respect to the cutter 20 for achieving the desired ratio of movement by the cutter in respect to its control by the cam followers 16 traversing the cam 18. The amount of rotation of the table E which will be carried out during the fall and rise portion set by the selector 220, will be determined by the change gears 184 and 179, as well as by a machine speed control setting effected by a dial 228. The control panel generally designated 230 also includes the usual motor start and stop buttons and machine start and stop buttons.

Figure 11:
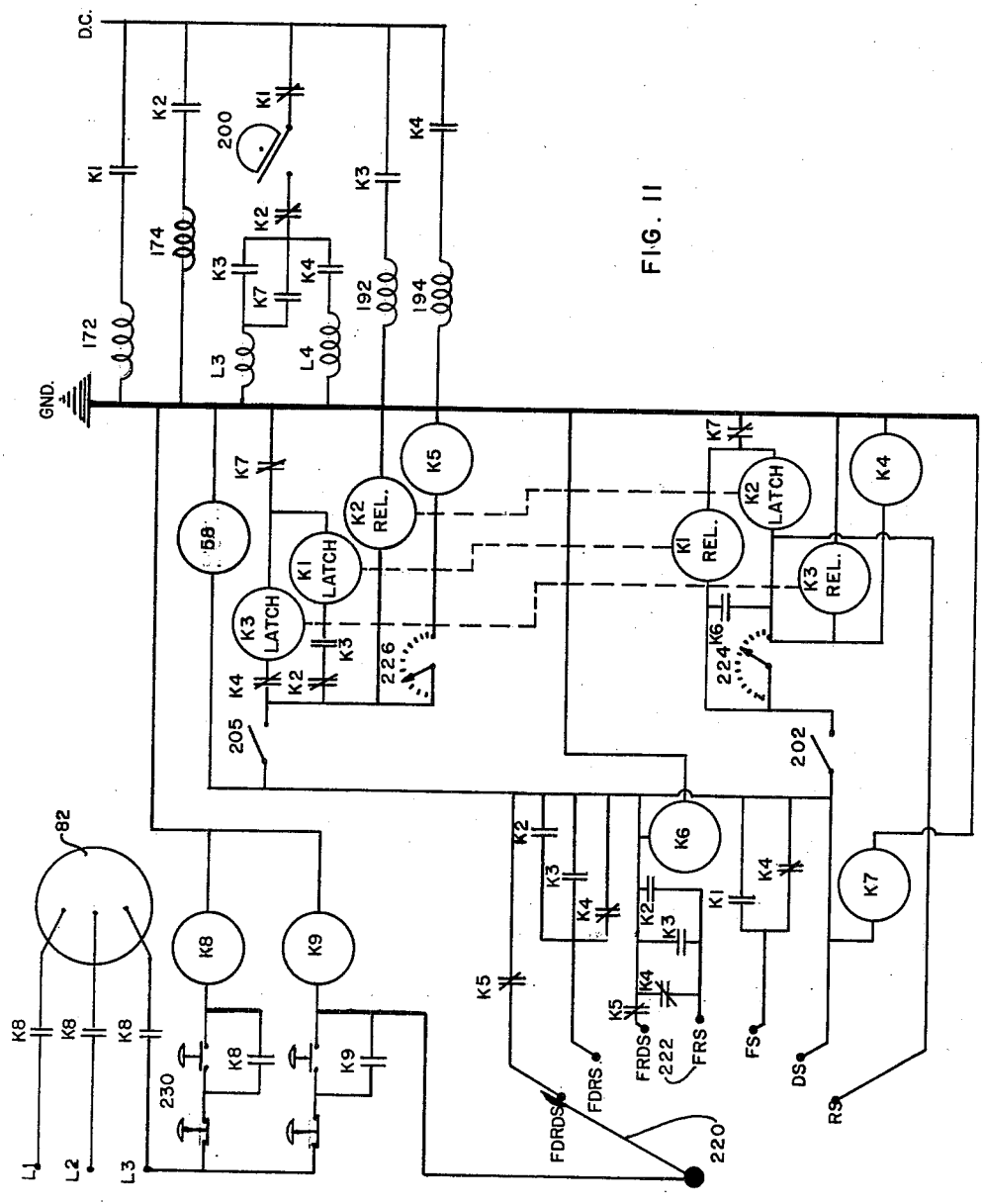
FIG. 11 is a somewhat schematic electrical diagram for the control mechanism.

In FIG. 11 there is indicated a schematic electrical diagram indication of the electrical control circuit, and this circuit will be described in relation to a complete operation, when the selector dial 220 is set at the Fall Dwell Rise Dwell Stop position.

It can be noted particularly in respect to FIG. 9 that the table E which mounts the work piece cam being cut is provided with stops which contact switches 202 and 205 in opposite end positions of rotation. Contact of these switches sets the machine for the extreme high or low positions, so that the mechanism will be operated to effect rotation of the shaft 19 with the master cam 18 in one direction or the other. When the selector switch is set to the Fall Dwell Rise Stop selection location and the machine start button is pressed, switch 205 will already be closed, indicating that the machine is in a position at the end of a high point on the cam. When this is true, then power from the power line indicated L1, L2 and L3 on the electrical drawing, will be connected to K1, since relay K3 latches instantly. This causes an actuation of clutch 172 which is located in the D.C. power line portion of the circuit and effects rotation of the master or control table. At the same time K3 is also latched to energize the first change gear clutch 192 and to drive the cutting table carrying the work piece. In this manner a fall will be cut out of the cam work piece by the cutter 16 and the angular extent to which this fall will be cut on the work piece wil be determined by the speed of the motor 58 as well as by the speed of the change gear 179.

A first dwell is begun when the switch 202 is closed by movement of the cam table. This excites K1 which is a release to de-energize clutch 172 and stop the rotating movement of shaft 19 which carries the master shaft 18. This effects the cutting of the dwell of the work piece and switch 209 which is actuated by projections 212 carried on a disc element 213 carried on shaft 136 and is pulsed to actuate solenoid L–B to trip the first dwell dial 224 backwardly appropriately to effect the correct number of degrees of dwell cutting on the cam work piece. This continues until the end of the dwell at which time first dwell dial 224 is moved back to zero to close the circuit and latch K2 and release K3 and de-energize the clutch 192 and to energize clutch 194 which drives shaft 136 for the rise cycle which is to follow.

When K2 is latched and the clutch 174 engaged, the master table is moved in a reverse direction and the circuit is such that dwell dial is not intermittently pulsed. The rise portion is cut on the work piece to the end of the sequence which is set by the closing of 205 by movement of the stop of table E into engagement therewith.

This effects the cutting of a second dwell when K2 is released, and since K1 cannot relatch (since K3 is released) to deenergize the clutch, this effects stopping of the rotation of the master cam 18. Second dwell dial switch 226 is thereupon pulsed backwardly from the amount at which it is set during the cutting of the work piece without any change in its position, the master cam table being held stationary. After the dwell is completed, K5 is released to stop the machine, or, if recycling is desired initially, then the entire cycle is repeated. In such event predetermining dwell switches 224 and 226 are automatically reset to their preset values.

Only one complete cycle has been fully described for the operation of the circuit shown schematically in FIG. 11, but it should be appreciated that the remaining dial indications may be similarly carried out in the same manner automatically.

Another feature of this machine is that the linear proportioning of the rises and falls which may be cut are infinitely variable. Thus the machine is capable of having integral magnifications, such as 2:1, 4:1, 10:1, etc., in accordance with the positioning of a roller on the proportioning beam in respect to the relationship of the cutter.

A further utilization of the machine includes a 1:1 or 2:1, or any desired ratio, in respect to an existing master cam. In some instances it may be desirable to cut a work piece which will be the exact physical size of the master cam. For a 1:1 duplication, the machine is set up with the cutter positioned directly over or under the tracing roller, so that the work piece in fact would be located in alignment with the tracing roller 16. In this arrangement, the cutter would generate the same curvature on the blank that is defined in the master cam mounted in vertical alignment therewith. Thus the machine may be employed for direct duplication of the master cam, in which case the angular ratio of turning of the work piece in respect to turning of the master cam would be identical and there would be a selection of appropriate change gearing to give the same speed to these tables. Usually, no electro-mechanical sequencing will be required and means are provided to make this sequencing inoperable when a 1:1 cam is to be cut.

While specfic embodiments of the invention have been shown and described in detail to illustrate the application of the invention principles, it will be understood that the invention may be embodied otherwise without departing from such principles.

What is claimed is:

1. A cutting machine comprising a proportioning beam pivotally mounted at one end and having a follower at its opposite end, a master control cam member rotatably mounted adjacent said follower, a work piece blank supporting table including a rotatable portion, said table being shiftable in axial directions in respect to the proportioning beam, a cutter mounted on said supporting beam and shiftable along the length therewith to overlie said work piece supporting table, and means to rotate said control cam and said work table in definite and predetermined variable time sequence whereby said cutter and said beam move relatively to said work piece by an amount in proportion to the movement of said follower over said control cam.

2. A device for cutting cams from blanks comprising a mounting base, a workpiece supporting table slidably mounted on said base, means for rotating said workpiece supporting table, a proportioning arm member pivotally mounted at its one end on said mounting base and having a follower on its opposite end, cutting means carried on said proportioning arm for operative association with a workpiece on said supporting table, a rotatable master profile cam mounted on said base adjacent said follower and operatively engaged with said follower, and selectively controllable transmission means to control the rotation and angular position of said master control profile cam and said work table in definite and selectively variable time sequence, said proportioning cam with said cutting means being advanced in a selected movement and even stopped by the angular displacement and stopping respectively of said master control profile cam.

3. A cam cutting device according to claim 2, wherein said selectively controllable transmission means for rotating said master profile cam and said work piece table includes means to rotate said control cam in both directions of rotation.

4. A cam cutting device according to claim 3, wherein said selectively controllable transmission means for rotating said work table and said master profile cam includes means for continuously rotating said work table and for intermittently rotating said master profile cam in both directions.

5. A device for moving one element such as a cutter over a defined path in respect to another element such as a workpiece, comprising rotatable mounting means for an element such as a work piece, a beam member pivotally mounted at one end and extending alongside said mounting means, a device such as a cutter carried by said beam, said mounting means and said device being shiftable in relation to the length of said beam for setting said mounting means in relation to said beam, cutter operation control means operating at a preselected location on said beam away from the pivotal mounting of said beam and movable to shift said beam about its pivotal mounting, and selectively controllable transmission means connected to said cutter operation control means and said workpiece mounting means for timed and selectively variable rotatable movement of said workpiece mounting means in respect to movement of said beam with said cutter for causing said cutter to form a workpiece positioned on said rotatable mounting means.

6. A forming machine comprising a member having a follower thereon, a master control cam member rotatably mounted adjacent said member, a workpiece blank supporting member, a workpiece blank supporting table including a rotatably workpiece supporting portion, said table being shiftable in linear directions, a forming tool connected to said member and adapted to be positioned to contact the workpiece positioned on said workpiece supporting portion of said table, and selectively controllable transmission means to rotate said control cam and said work table in definite and predetermined variable timed sequence to move said member with said forming tool relatively to said workpiece in proportion to the movement of said follower over said control cam and in accordance with the angular displacement of said workpiece on said workpiece supporting portion of said table.

7. A device according to claim 6, wherein said cutter operation control means movable to shift said beam about its pivot includes a cam, said beam having follower means in engagement with said cam, and wherein said transmission means permits selectively moving and holding said cam stationary.

8. A device according to claim 7, wherein said follower is carried on said beam at a location spaced in relation to the pivotal connection of said beam beyond the position of said mounting means.

9. A device according to claim 5, wherein said mounting means includes a table shiftable in a direction longitudinally in respect to said beam, said cutter operation control means movable to shift said beam about its pivot, including master cam means arranged at a fixed location in respect to said pivot.

10. A device according to claim 5, wherein said mounting means includes a work piece table, advancing screw means for shifting said work piece table in a longitudinal direction in respect to said beam.

11. A device according to claim 5, wherein said selectively controllable transmission means includes a driving motor, a rotatable cam driven by said motor, and separately variable driving means connected between said rotatable cam and said mounting means to rotate said mounting means in a selected proportion to the rotation of said cam.

12. A device for moving a cutter in respect to a work piece comprising movable beam means carrying the cutter including a follower, a work piece table including a movable portion, means permitting relative movement between said follower and said work piece table, and selectively controllable transmission means operatively connected to said beam means and to said work table to shift said beam means with the cutter in a selectively variable manner in relation to said work table and to move the movable portion of the work table in selectively variable timed relation to movement of said beam means.

13. A forming machine comprising a member having a follower thereon, a master control cam member rotatably mounted adjacent said member, a workpiece blank supporting member adjacent said member, a workpiece blank supporting table including a rotatably workpiece supporting portion, said table being shiftable in linear directions, a forming tool connected to said member and adapted to be positioned to contact the workpiece positioned on said workpiece supporting portion of said table, and selectively controllable transmission means to rotate said control cam and said work table in definite and predetermined variable timed sequence to move said member with said forming tool relatively to said workpiece in proportion to the movement of said follower over said control cam and in accordance with the angular displacement of said workpiece on said workpiece supporting portion of said table, said member comprising an elongated beam pivotally mounted at one end and having said follower mounted thereon adjacent its opposite end, said cutter being adjustably positionable along the length of said beam.

14. A forming machine comprising a member having a follower thereon, a master control cam member rotatably mounted adjacent said member, a workpiece blank supporting member adjacent said member, a workpiece blank supporting table including a rotatably workpiece supporting portion, said table being shiftable in linear directions, a forming tool connected to said member and adapted to be positioned to contact the workpiece positioned on said workpiece supporting portion table, selectively controllable transmission means to rotate said control cam and said work table in definite and predetermined variable timed sequence to move said member with said forming tool relatively to said workpiece in proportion to the movement of said follower over said control cam and in accordance with the angular displacement of said workpiece on said workpiece supporting portion of said table, said member comprising an elongated beam pivotally mounted at one end and having said follower mounted thereon adjacent its opposite end, said cutter being adjustably positionable along the length of said beam, said beam being supported for pivotal movement intermediate its end by a metal ball, and a driving electric motor mounted on said beam and connected to said cutter to rotate said cutter.

15. A forming machine comprising a member having a follower thereon, a master control cam member rotatably mounted adjacent said member, a workpiece blank supporting member adjacent said member, a workpiece blank supporting table including a rotatably workpiece supporting portion, said table being shiftable in linear directions, a forming tool connected to said member and adapted to be positioned to contact the workpiece positioned on said workpiece supporting portion table, and selectively controllable transmission means to rotate said control cam and said work table in definite and predetermined variable timed sequence to move said member with said forming tool relatively to said workpiece in proportion to the movement of said follower over said control cam and in accordance with the angular displacement of said workpiece on said workpiece supporting portion of said table, said member comprising an elongated beam pivotally mounted at one end and having said follower mounted thereon adjacent its opposite end, said cutter being adjustably positionable along the length of said beam, said selectively controllable transmission means including a driving electric motor, clutch and gear means connected between said electric motor to said master control cam and to said rotatable workpiece supporting portion of said table, said gear and clutch means selectively permitting: rotation of said master control cam and said rotatable workpiece supporting portions at the same speeds and at variable speeds and permitting rotation of said rotatable workpiece supporting portion when said master control cam member is held stationary.

16. A forming machine, according to claim 14, wherein said selectively controllable transmission means includes means for automatically effecting: rotation of said control cam member and said workpiece supporting portion of said table at selectively variable speeds and the stopping of said master control cam member for cutting a full cam profile including rise, fall and swell contoured surfaces on a workpiece.

References Cited in the file of this patent

UNITED STATES PATENTS

| | | |
|---|---|---|
| 2,069,189 | Taylor | Jan. 26, 1937 |
| 2,161,709 | Henkes | June 6, 1939 |
| 2,661,661 | Zoll | Dec. 8, 1953 |
| 2,739,511 | Rafart | Mar. 27, 1956 |
| 3,004,476 | McCullough | Oct. 17, 1961 |